Patented Dec. 23, 1952

2,622,964

UNITED STATES PATENT OFFICE 2,622,964

METHOD FOR HYDROLYZING TITANIFEROUS SOLUTIONS

Leif Aagaard, Plainfield, and Frank J. Schultz, Fords, N. J., assignors to National Lead Company, New York, N. Y., a corporation of New Jersey No Drawing. Application January 14, 1949, Serial No. 71,044

6 Claims. (Cl. 23—202)

The present invention relates to the thermal hydrolysis of titanium chloride solutions, more particularly to the hydrolysis of titanium chloride solution which contains small amounts of fluoride ions to obtain hydrolysates which may be further processed to high quality titanium dioxide pigments.

Because the hydrolysis of chloride solutions of titanium yields precipitates which calcine directly to rutile titanium dioxide, or which convert at relatively low temperatures to rutile, there is considerable interest in the use of such solutions in the preparation of titanium dioxide. However, since such preparation depends upon a cheap abundant supply of titanium chloride solution which has not heretofore been available, commercial preparation of titanium dioxide pigments from titanium chloride solutions has not been developed. In U. S. Patent No. 2,576,483, there is described and claimed a method by which chloride solutions of titanium containing small amounts of fluorine ions may be prepared cheaply and easily from a titaniferous material, such as ilmenite. The present invention provides a means whereby such solution may be hydrolyzed to yield hydrolysates possessing proper characteristics to give upon further processing high quality titanium dioxide pigments.

It is, therefore, an object of the present invention to provide a method for hydrolyzing chloride solutions of titanium which contain a small amount of fluoride ions. Another object of the invention is to provide a method for obtaining from chloride solutions of titanium which contain a small amount of fluoride ions hydrolysates which on further processing yield high grade titanium dioxide pigments. These and other objects of the invention will become apparent from the following description of the invention.

In its broadest aspect, the invention contemplates the hydrolysis of a chloride solution of titanium which contains fluoride ions by boiling said solution containing small amounts of nucleating and coagulating agents, said chloride solution having a basicity of at least 45% and a concentration of titanium, calculated as $TiO_2$ of at least 250 grams per liter.

As disclosed in U. S. Patent No. 2,576,483, the titanium chloride solution which is hydrolyzed according to the method of the instant invention, may contain fluoride ions present in amount from 0.1% to about 10%, calculated as HF, and based on the weight of titanium, calculated as $TiO_2$ in the solution.

Operating the invention with a chloride solution containing fluoride ions as obtained from the process described in U. S. Patent No. 2,576,483, it is necessary to determine the basicity of the solution and the titanium dioxide concentration. By basicity is meant the degree by which the titanium, calculated for instance, as $TiO_2$ exceeds the amount of hydrochloric acid theoretically required to form the normal chloride $TiCl_4$. Thus, the normal salt will require 4 mols of HCl for every mol of $TiO_2$ and when there is present less than that amount, the solution is said to be basic. A solution containing 3 mols of HCl for 1 mol $TiO_2$ is then said to be 25% basic and one having 2 mols HCl per mol of $TiO_2$, 50% basic. If the basicity of the solution to be hydrolized according to the present invention is not at least 45% and the $TiO_2$ concentration at least 250 grams per liter, as will generally be the case, an evaporation treatment must be employed. This is best carried out in a vacuum evaporator in which both HCl and water are removed from the solution. It may be necessary at times after the evaporation to return to the solution an amount of hydrochloric acid or water to obtain the desired basicity and concentration but those skilled in the art will know how to make these adjustments.

The invention may be operated with solutions having basicities between about 45% and about 60% preferably between about 50% and 55%, and concentrations of $TiO_2$ between about 250 and 350 grams per liter, preferably about 270 and 320 g. p. l., more especially 300–320 grams per liter. As the basicity and concentration increase the solutions tend to thicken so that above the maximums given, i. e. 60% basic and 350 grams $TiO_2$ per liter the solutions are generally to thick to handle conveniently. Lower concentrations of $TiO_2$ permit the employment of high basicities without excessive thickening but when both the basicity and concentration of $TiO_2$ are high, the limits of 60% basic and 350 grams $TiO_2$ per liter cannot be much exceeded. The ranges of basicity and concentration refer to the basicity and $TiO_2$ concentration at hydrolysis, after nucleation.

In practicing the invention, any known type of nucleating composition useful for hydrolyzing chloride solutions of titanium may be employed. A convenient nucleating agent may be prepared from the solution to be hydrolyzed, for instance, by taking a portion of the solution, diluting it, and heating the diluted solution to develop nucleating properties. Alternatively, the chloride solution may be run into hot water. In such manner nucleating compositions may be obtained containing about 15 to about 20 grams $TiO_2$ per liter.

The amount of nucleating agent to be added to the solution to be hydrolyzed may vary between as little as 0.5 and 5.0% based on the total TiO₂ content of the hydrolysis solution, depending upon whether the nucleating agent is added to the solution cold or when the solution has been brought to boiling temperature. It is a feature of the invention to add the nucleating agent to the hydrolysis solution when it has been heated to boiling and when the addition is made at this point, a lesser amount of 0.5% to about 1.0% may be employed. This is a surprising effect and results in economy of nucleating agent production and a minimum decrease in basicity and concentration of the hydrolysis solution. The nucleating agent can, of course, be added while the solution is at room temperature, but in this case, amounts up to from about 2.0% to about 5.0% have to be used. In general, it is preferred to add the small amount to the boiling hydrolysis solution. When so doing, it is possible to obtain yields of high quality hydrolysate of upwards of 95% of the TiO₂ in the hydrolysis solution by boiling for 30 minutes and even less.

The coagulating agent which should be added to the hydrolysis solution in order that the hydrolysate coagulates and precipitates readily out of solution in a readily filterable form should be a compound having a polyvalent, negative ion, such as a phosphate, sulfate, or the like, as taught in Patents No. 2,113,945 and No. 2,113,946, issued April 12, 1938, to Plechner and Hixson. Sulfuric acid is a cheap and readily available coagulant for practice of the invention and may be added as directed in the said patents.

The hydrolysis itself is accomplished by simple boiling and yields of 95% and higher are obtained after 30 minutes boiling. The resulting hydrolysates may be further processed in known manner to high quality titanium dioxide pigments. They may be mixed with the usual addition agents such as alkali metal compounds and calcined in the usual way. It has been found that the hydrolysate tends to absorb both HF and the coagulant, for instance, sulfuric acid from the hydrolysis solution. When it is desired to prepare high quality rutile pigments from the hydrolysates of the present invention, as by calcining in the presence of a rutile promoter in known manner, these absorbed agents, when present in large amounts, tend to retard rutile formation and should be removed. This can be done by washing with an alkaline solution, for instance, a solution of sodium hydroxide, following by a wash with a slightly acid solution to eliminate the alkali metal salts, prior to adding the rutile promoter and other conditioning agents.

The following examples will more particularly illustrate the invention:

*Example I*

A chloride solution obtained according to U. S. Patent 2,576,483, was treated with metallic iron to reduce all the ferric iron to ferrous state, together with a small amount of the titanium. It then had the following composition:

| | |
|---|---|
| Sp. gr. (at 25° C.) | 1.445 |
| TiO₂ _____g. p. l__ | 274 |
| FeCl₂ _____g. p. l__ | 47.7 |
| HCl _____g. p. l__ | 379 |
| Reduced Ti_____g. p. l. (as TiO₂) __ | 3 |
| HF _____g. p. l__ | 3 |
| Basicity _____per cent__ | 24.2 |
| HF:TiO₂ ratio _____ | .011 |

To the solution 27.4 grams per liter H₂SO₄ were added to act as a coagulant during the subsequent hydrolysis. The solution was then evaporated under vacuum to increase the basicity and TiO₂ concentration. After 2 hours evaporation under a vacuum of 23 inches of mercury at 75° C., the composition was as follows:

| | |
|---|---|
| Sp. gr. (at 25° C.) | 1.520 |
| TiO₂ _____g. p. l__ | 363 |
| FeCl₂ _____g. p. l__ | 60.2 |
| HCl _____g. p. l__ | 312 |
| Reduced Ti_____g. p. l. (as TiO₂) __ | 4 |
| HF _____g. p. l__ | 4 |
| Basicity (exclusive of SO₄ present) per cent__ | 53 |
| HF:TiO₂ ratio _____ | .011 |

To prepare the nucleating composition, a portion of this solution was diluted at 15° C. with water to a TiO₂ content of 15 grams per liter and heated to 80° C. in 40 minutes, then held at 80° C. for 5 minutes. The nuclear liquor was immediately cooled to room temperature.

One liter of the concentrated solution was then heated to boiling in a suitable vessel and an amount of nucleating liquor sufficient to furnish 1% of the total TiO₂ in the mixture was then added to the boiling solution with agitation. The composition of the nucleated solution was as follows:

| | |
|---|---|
| TiO₂ _____g. p. l__ | 295 |
| FeCl₂ _____g. p. l__ | 50.3 |
| HCl _____g. p. l__ | 253 |
| Reduced TiO₂_____g. p. l. (as TiO₂) __ | 3.2 |
| HF _____g. p. l__ | 3.2 |
| H₂SO₄ _____g. p. l__ | 29.4 |
| Basicity _____per cent__ | 53 |
| HF:TiO₂ ratio _____ | .011 |

The nucleated solution was then brought back to boil in 10 minutes and boiled for 30 minutes. The yield of TiO₂ in the hydrolysate was 96%.

The product was then admixed with a rutile promoter, and conditioning agents, such as K₂SO₄ and Al₂O₃, in known manner and calcined at 850° C. for 3 hours a high grade titanium dioxide pigment was obtained consisting of 100% rutile and having a tinting strength of 1600–1650, determined by the well-known Reynold's method.

*Example II*

In this example, the nucleating composition was prepared by running 140 cc. of the concentrated solution obtained in Example I into 700 cc. of water at 80° C. Only 0.5% was used in the hydrolysis. In other respects, the procedure was the same as described in Example I. After boiling for 30 minutes, a yield in excess of 96% was obtained. When converted to pigmentary TiO₂, the product was identical with that obtained in Example I.

After hydrolysis is complete, there is obtained in the practice of the invention, in addition to the hydrolysate, a hydrochloric acid mother liquor which contains a fluoride compound or ions. It is possible to utilize this hydrolysis waste acid in the extraction treatment of titaniferous materials, e. g. ilmenite, to obtain additional quantities of titanium chloride solution. Co-pending application Serial Number 70,912, filed January 14, 1949, by Schultz, Dahlstrom and Cole, now abandoned, describes and claims a unitary integrated cyclical process wherein the hydrolysis mother liquor is reutilized for the extraction of titaniferous materials.

The foregoing description has been given for purposes of illustration, but the invention is not to be limited thereto and various modifications and variations within the scope of the appended claims may be employed.

We claim:

1. Method for hydrolyzing a titanium chloride solution containing fluoride ions and iron chloride said fluoride ions being present in amount from 0.1% to about 10% calculated as HF and based on the weight of titanium calculated as $TiO_2$ in said solution which comprises reducing iron chloride in said solution to ferrous chloride and admixing said titanium chloride solution with a nucleating agent and a coagulating agent, adjusting the concentration of the titanium values in said mixture to at least 250 grams per liter $TiO_2$ and a basicity of at least 45% and hydrolyzing by boiling thereby to precipitate the titanium values therefrom.

2. Method according to claim 1 in which the amount of nucleating agent added based on the $TiO_2$ content of said solution is between about 0.5% and about 5%.

3. Method according to claim 1 in which the coagulating agent is sulphuric acid.

4. Method according to claim 1 in which said nucleating agent is added to said mixture at substantially boiling temperature.

5. Method for hydrolyzing a titanium chloride solution containing fluoride ions and iron chloride said fluoride ions being present in amount from 0.1% to about 10% calculated as HF and based on the weight of titanium calculated as $TiO_2$ in said solution which comprises reducing iron chloride in said solution to ferrous chloride and admixing said titanium chloride solution with a nucleating agent and a coagulating agent, adjusting the concentration of the titanium values in said mixture from between 250 and about 350 grams per liter and a basicity from between 45% and 60% and hydrolyzing by boiling thereby to precipitate the titanium values therefrom.

6. Method for hydrolyzing a titanium chloride solution containing fluoride ions and iron chloride said fluoride ions being present in amount from 0.1% to about 10% calculated as HF and based on the weight of titanium calculated as $TiO_2$ in said solution which comprises reducing iron chloride in said solution to ferrous chloride and admixing said titanium chloride solution with a nucleating agent and a coagulating agent, adjusting the concentration of the titanium values in said mixture from between about 270 and about 320 grams per liter and a basicity from about 50% and 55% and hydrolyzing by boiling thereby to precipitate the titanium values therefrom.

LEIF AAGAARD.
FRANK J. SCHULTZ.

REFERENCES CITED

The following references are of record in the file of this patent:

UNITED STATES PATENTS

| Number | Name | Date |
| --- | --- | --- |
| 1,348,129 | Goldschmidt et al. | July 27, 1920 |
| 2,034,923 | Schmidt | Mar. 24, 1936 |
| 2,088,913 | Llewellyn | Aug. 3, 1937 |
| 2,091,955 | Allan | Sept. 7, 1937 |
| 2,113,945 | Plechner | Apr. 12, 1938 |
| 2,113,946 | Plechner | Apr. 12, 1938 |
| 2,237,764 | McKinney | Apr. 8, 1941 |
| 2,285,486 | Barksdale | June 9, 1942 |
| 2,331,496 | Olson | Oct. 12, 1943 |
| 2,369,262 | Stark | Feb. 13, 1945 |
| 2,441,856 | Turner | May 18, 1948 |
| 2,452,390 | Olson | Oct. 26, 1948 |

FOREIGN PATENTS

| Number | Country | Date |
| --- | --- | --- |
| 296,730 | Great Britain | Dec. 5, 1929 |